(12) United States Patent  
Moon

(10) Patent No.: US 10,459,467 B1  
(45) Date of Patent: Oct. 29, 2019

(54) SWITCHING REGULATOR WITH SOFT START CIRCUIT AND OPERATION METHOD THEREOF

(71) Applicant: FCI Inc., Bundang-gu, Seongnam-si (KR)

(72) Inventor: Je Cheol Moon, Seongnam-si (KR)

(73) Assignee: FCI INC., Bundang-Gu, Seongnam-si, Gyeonggi-Do (KR)

( * ) Notice: Subject to any disclaimer, the term of this patent is extended or adjusted under 35 U.S.C. 154(b) by 0 days.

(21) Appl. No.: 16/353,074

(22) Filed: Mar. 14, 2019

(30) Foreign Application Priority Data

Jul. 5, 2018 (KR) .................. 10-2018-0078345

(51) Int. Cl.
| | |
|---|---|
| *H02M 1/36* | (2007.01) |
| *H02M 3/156* | (2006.01) |
| *G05F 1/46* | (2006.01) |
| *G05F 1/575* | (2006.01) |

(52) U.S. Cl.
CPC .............. *G05F 1/468* (2013.01); *G05F 1/575* (2013.01); *H02M 3/156* (2013.01)

(58) Field of Classification Search
CPC .......... H02M 1/36; H02M 3/156; G05F 1/468
See application file for complete search history.

(56) References Cited

U.S. PATENT DOCUMENTS

2012/0206121 A1* 8/2012 Evans .................. H02M 1/36
323/288

* cited by examiner

*Primary Examiner* — Gary L Laxton
*Assistant Examiner* — Sisay G Tiku
(74) *Attorney, Agent, or Firm* — Muncy, Geissler, Olds & Lowe, P.C.

(57) ABSTRACT

Disclosed herein is a switching regulator with a soft start circuit for suppressing an in-rush current. The switching regulator includes a peak detector configured to receive a clock signal and detect a peak voltage of the clock signal, a comparator configured to generate a soft start signal for controlling a soft start of the switching regulator based on a result of comparing a level of the peak voltage of the clock signal to a preset reference voltage level, a counter configured to switch a state of the soft start signal at a time point when a preset soft start time arrives, and a ramp voltage generation unit configured to generate a ramp voltage by adjusting a resistance of a variable resistor based on the soft start signal.

10 Claims, 4 Drawing Sheets

SWITCHING REGULATOR WITH SOFT START CIRCUIT AND OPERATION METHOD THEREOF

FIELD OF DISCLOSURE

The present disclosure relates to a switching regulator with a soft start circuit, and more particularly to a switching regulator capable of reducing a soft start time while maintaining circuit complexity, and an operating method thereof.

BACKGROUND

An excessive amount of in-rush current may occur through a main switch when a switching regulator is initially driven. The in-rush current shortens a life of a small-capacity power supply such as, e.g., a battery, and is particularly lethal to a limitary coin-cell having a maximum limit current ranging from 30 to 100 mA. Therefore, in order to prevent occurrence of the in-rush current, the switching regulator includes a soft start circuit.

Conventional soft start circuits are largely divided into an analog type and a digital type.

An analog soft start circuit operates in such a manner as to slowly increase a reference voltage and apply the reference voltage to an error amplifier in order to suppress the in-rush current. The analog soft start circuit includes a high capacitance capacitor or a small magnitude of current source in order to suppress the in-rush current, resulting in problems such as a reduction in a degree of circuit integration and an increase in a sample variation of the in-rush current.

The digital type soft start circuit operates in such a manner as to delay an initial driving time of the switching regulator by means of an oscillation clock in order to suppress the in-rush current. However, there are problems that the digital type soft start circuit requires a turn-on procedure of the switching regulator, and the sample variation of the in-rush current becomes higher when the oscillation clock fluctuates.

SUMMARY OF THE DISCLOSURE

Embodiments of the present disclosure provide a switching regulator with a soft start circuit capable of suppressing an in-rush current within a relatively short initial driving time without increasing circuit complexity and an operation method thereof.

An aspect of the present disclosure provides a switching regulator with a soft start circuit for suppressing an in-rush current. The switching regulator may include a peak detector configured to receive a clock signal and detect a peak voltage of the clock signal, a comparator configured to generate a soft start signal for controlling a soft start of the switching regulator based on a result of comparing a level of the peak voltage of the clock signal to a preset reference voltage level, a counter configured to switch a state of the soft start signal at a time point when a preset soft start time arrives, and a ramp voltage generation unit configured to generate a ramp voltage by adjusting a resistance of a variable resistor based on the soft start signal.

Another aspect of the present disclosure provides a method of operating a switching regulator with a soft start circuit for suppressing an in-rush current. The method of operating a switching regulator may include: receiving a clock signal and detecting a peak voltage of the clock signal, generating a soft start signal for controlling a soft start of the switching regulator based on a result of comparing a level of the peak voltage of the clock signal to a level of a preset reference voltage—the soft start signal maintaining an on-state during a preset soft start time, and generating a ramp voltage by adjusting a resistance of a variable resistor based on the soft start signal.

The soft start circuit according to embodiments of the present disclosure may suppress the in-rush current within a short time without increasing the circuit complexity.

DETAILED DESCRIPTION

Figure 1:
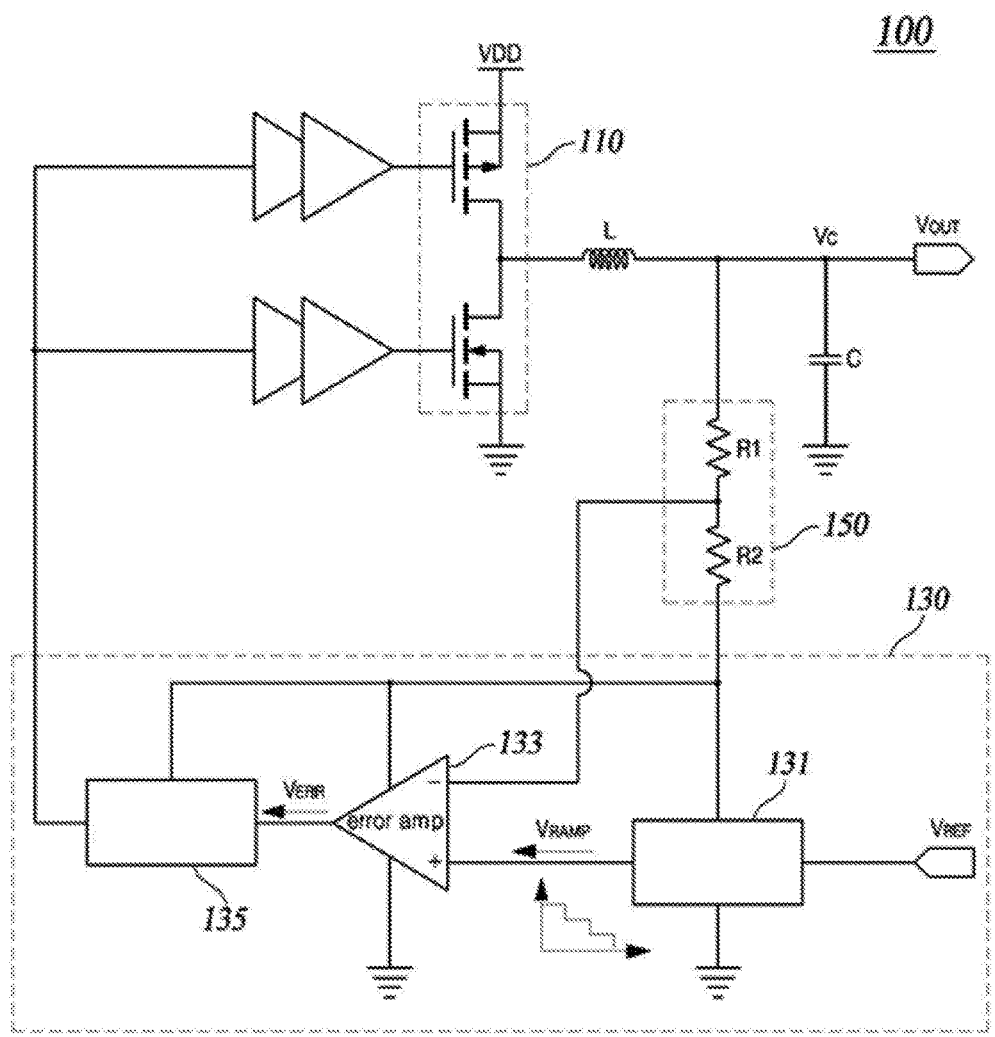
FIG. 1 illustrates a switching regulator with a soft start circuit according to embodiments of the present disclosure.

Hereinafter, some embodiments of the present disclosure will be described in detail with reference to illustrative drawings. Regarding the reference numerals assigned to the elements in the drawings, it should be noted that the same elements will be designated by the same reference numerals, wherever possible, even though they are shown in different drawings. Further, in the description of the embodiments, the detailed description of well-known related configurations or functions will be omitted when it is deemed that such description will cause ambiguous interpretation of the present disclosure.

In addition, terms such as first, second, A, B, (a), (b) or the like may be used herein when describing constituent elements of the present disclosure. Each of these terms is not used to define an essence, order, sequence or the number of a corresponding constituent element but used merely to distinguish the corresponding constituent element from other constituent element(s). Terms such as "comprise" and "include" used throughout the whole specification refer to the presence of the corresponding constituent element and are not intended to exclude one or more additional constituent element, unless otherwise specified. Terms such as "portion (or unit)", "-or", "-er", and "module" refer to a unit which processes at least one function or operation, and may be implemented by a hardware, a software, or a combination of the hardware and the software.

Hereinafter, embodiments of the present disclosure will be described in more detail with reference to the accompanying drawings.

FIG. 1 illustrates a switching regulator with a soft start circuit according to an embodiment of the present disclosure.

Referring to FIG. 1, a switching regulator 100, which is a constituent element necessary for regulating DC input power to generate a preset level of DC output power, may include a power switch 110, a power switch control unit 130, and a voltage distribution unit 150.

The power switch 110 performs a switching operation under the control of the power switch control unit 130 to regulate a level of the DC input power to a preset target level. For this purpose, the power switch 110 may include at least one switching element.

For example, the power switch 110 may include one P-type metal oxide semiconductor (PMOS) transistor and one N-type metal oxide semiconductor (NMOS) transistor connected in series between a DC input power supply terminal VDD and an output terminal VC. In this case, the PMOS transistor and the NMOS transistor may perform an interleaving operation in response to a switch control signal of the power switch control unit 130, thereby regulating a level of the DC input power to the preset target level.

The power switch control unit 130 may control the switching operation of the switching regulator 100 so that an output voltage gradually increases during a soft start time so as to reach the preset target level, thereby suppressing an in-rush current that may occur at an initial stage of applying power to the switching regulator 100, and generating DC output power that is at the corresponding target level.

In order to perform such an operation, the power switch control unit 130 may include a soft start circuit 131, an error amplifier 133, and a power switch control signal generation unit 135.

The soft start circuit 131 may receive a reference voltage Vref and output a ramp voltage Vramp that gradually increases during a preset soft start time. Here, the soft start time, which is the time required to prevent the occurrence of the in-rush current of the switching regulator 100, may be preset based on system requirements, an element design, or the like.

The error amplifier 133 may receive the ramp voltage Vramp output from the soft start circuit 131 and a voltage Vf fed back from the voltage distribution unit 150, and may compare both voltages to output an error voltage Verr.

The power switch control signal generation unit 135 may generate a power switch control signal based on the error voltage Verr output from the error amplifier 133. Here, the power switch control signal may be a pulse width modulation (PWM) signal or a pulse frequency modulation (PFM) signal. However, it should be noted that this configuration is merely an example, and the embodiments of the present disclosure are not limited thereto.

Figure 2:
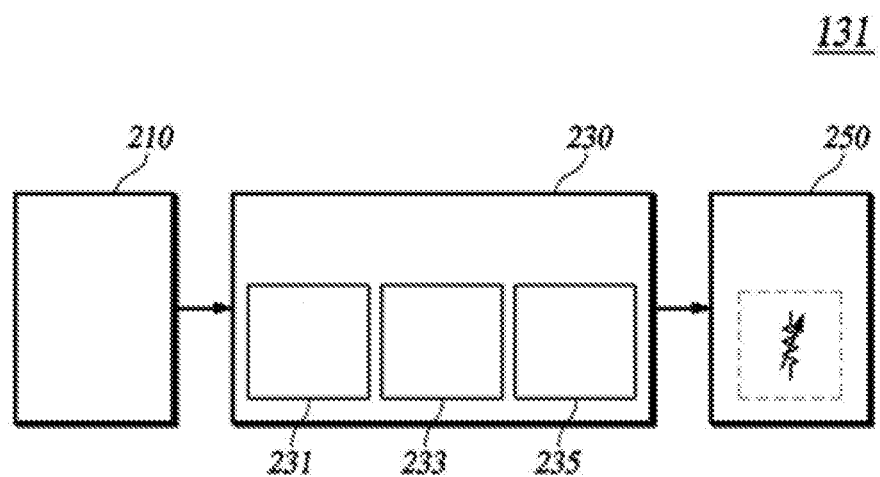
FIG. 2 is a block diagram illustrating a soft start circuit according to embodiments of the present disclosure.

FIG. 2 is a block diagram illustrating the soft start circuit of FIG. 1.

Referring to FIG. 2, the soft start circuit 131 may include a clock signal supply unit 210, a soft start signal generation unit 230, and a ramp voltage generation unit 250.

When power is applied to the switching regulator 100 and a certain period of time has elapsed, the clock signal supply unit 210 may supply a clock signal CLK having a constant magnitude to the soft start signal generation unit 230 through a clock buffer. Here, the clock signal CLK may be a system clock output from an oscillator (not illustrated).

Also, the clock signal CLK may be a real-time clock output from a crystal clock (X-tal; not illustrated). The crystal clock may operate by using its own auxiliary power even when power is not applied to a power supply device including the switching regulator 100, and may output a clock signal having a particular frequency of, for example, 32,768 Hz.

As described above, according to embodiments of the present disclosure, it is possible to simply implement a switching regulator having a soft start function by using a conventional system clock as it is, without implementing a generation circuit of a clock signal for counting a soft start time.

The soft start signal generation unit 230 may receive the clock signal from the clock signal supply unit 210 and generate a soft start signal that remains in an on-state during the soft start time. At this time, the generated soft start signal may be transmitted to the ramp voltage generation unit 250 and used to suppress the occurrence of the in-rush current. In order to perform such an operation, the soft start signal generation unit 230 may include a peak detector 231, a comparator 233, and a counter 235.

The peak detector 231 may detect a peak voltage corresponding to an envelope of the input clock signal. The peak detector 231 may have any commercially available structures, which is obvious to those skilled in the art, and thus an additional description thereof will be omitted.

The comparator 233 may compare an output (i.e., peak voltage) level of the peak detector 231 to a preset reference voltage level to generate a soft start signal indicative of two states including an on-state and an off-state. That is, when the peak voltage level is equal to or higher than the preset reference voltage level, the comparator 233 may generate a constant level of voltage that indicates the on-state. Here, the reference voltage may be a bias voltage generated by connecting a load between a power supply voltage and a ground electrode.

The comparator 233 may be a general comparator that outputs a result of comparing magnitudes of input signals, and may be preferably a comparator having hysteresis.

The comparator 233 having hysteresis may output a stabilized trigger signal having few changes even when flowability of the detected peak voltage (i.e., an output of the peak detector 231) is high.

The comparator 233 having hysteresis may switch an output at a voltage lower than the reference voltage when the peak voltage is in a direction in which the peak voltage decreases in comparison to when the peak voltage increases. Therefore, the comparator 233 having hysteresis may not switch the output even when the peak voltage temporarily becomes lower than a comparison voltage. As a result, an unnecessary trigger signal may not be generated.

The counter 235 may add a timing being switched to the off-state to the soft start signal generated by the comparator 233. A time point when the soft start signal is switched to the off-state may be a time point when a preset soft start time arrives after power is applied to the switching regulator 100. Here, the soft start time, which is the time required to prevent the occurrence of the in-rush current of the switching regulator 100, may be preset as, for example, the number of cycles of the clock signal and the like.

Figure 3:
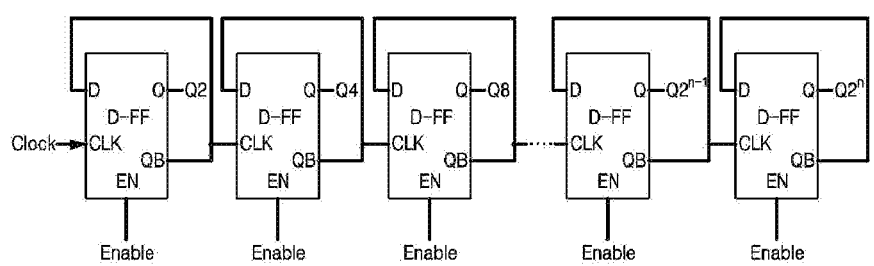
FIG. 3 illustrates a counter according embodiments of the present disclosure.

The counter 235 may be implemented as N number of cascaded D-flip flops (D-FFs), as illustrated in FIG. 3. Here, N is a positive integer.

Referring to FIG. 3, an output of an output terminal Q of each of the N number of D-flip flops may be output to the outside as each digit output signal of the counter 235. Also, an output of a sub-output terminal QB of each of the N number of D-flip flops may be fed back to a data input terminal D, and then may be input to the clock terminal CLK of the next D flip-flop.

The counter 235 may determine a time point when N number of digit output signals (Q2 to Q2N) are all in a high state as a soft start ending time point, and may switch the soft start signal from an on-state to an off state at the corresponding time point. The soft start ending time point may be determined based on the number of digit output signals, and the soft start time may be set and changed by adjusting the number of digit output signals.

As a result, the soft start signal generation unit 230 may output a soft start signal that is turned on at a particular voltage when power is supplied to the switching regulator 100, and then turned off after the soft start time.

The ramp voltage generation unit 250 may generate a ramp voltage Vramp by adjusting a resistance of a variable resistor during the soft start time under the control of the soft start signal input from the soft start signal generation unit 230. Specifically, the ramp voltage generation unit 250 may generate a ramp voltage Vramp by gradually increasing or decreasing the resistance of the variable resistor by a preset magnitude while the soft start signal is in an on-state.

Here, the ramp voltage may be input to a non-inverting terminal of the error amplifier 123 described above with reference to FIG. 1 as a voltage across both ends of the variable resistor. As a result, the ramp voltage generated by the ramp voltage generation unit 250 during the soft start time may be input to the error amplifier 123 and used to control a power switch in a direction to suppress the in-rush current.

As described above, the switching regulator according to embodiments of the present disclosure may prevent a chip size of the power supply device from increasing by using the system clock without implementing an additional circuit for generating the clock signal, and may generate a ramp voltage by using the variable resistor, thereby reducing a total amount of current consumed.

In addition, the switching regulator according to embodiments of the present disclosure may adjust the soft start time in consideration of system requirements and the like, thereby reducing a turn-on time of the power supply device in comparison to a case where the conventional soft start circuit is used.

Hereinafter, with reference to FIGS. 4A to 4C, an operation waveform of the switching regulator with the soft start circuit according to embodiments of the present disclosure will be described in comparison to that according to the related art.

Figure 4A:
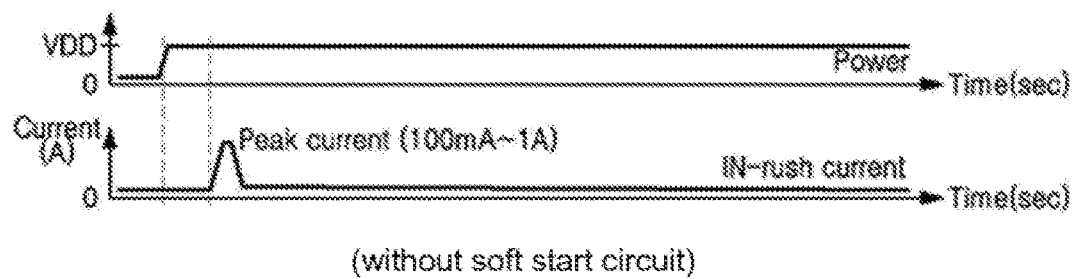
FIG. 4A illustrates an operation waveform of a switching regulator according to the related art.

FIG. 4A illustrates an operation waveform of a switching regulator according to the related art. FIG. 4B illustrates an operation waveform of a switching regulator including an analog soft start circuit according to the related art. FIG. 4C illustrates an operation waveform of a switching regulator with a soft start circuit according to an embodiment of the present disclosure.

Referring to FIG. 4A, in the conventional switching regulator which does not include a soft start circuit, it can be seen that power is supplied to a power supply device and a peak current (i.e., an in-rush current) having a value of 100 mA to 1 A occurs immediately after a reference voltage is applied to an error amplifier for generating a power switch control signal (at a time point b).

Figure 4B:
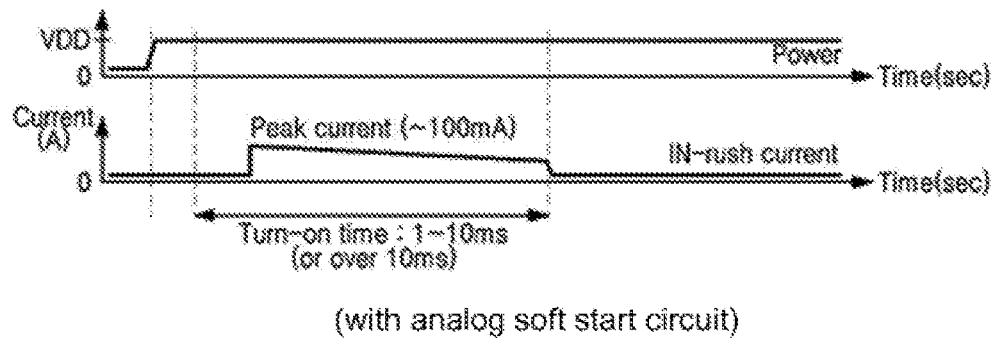
FIG. 4B illustrates an operation waveform of a switching regulator including an analog soft start circuit according to the related art.

Referring to FIG. 4B, in the conventional switching regulator including an analog soft start circuit for suppressing the occurrence of an in-rush current, it can be seen that a peak current having a value of 100 mA or less occurs in a relatively wide time range of 1 ms to 10 ms (i.e., a soft start time) by delaying a turn-on time of a power supply device.

Figure 4C:
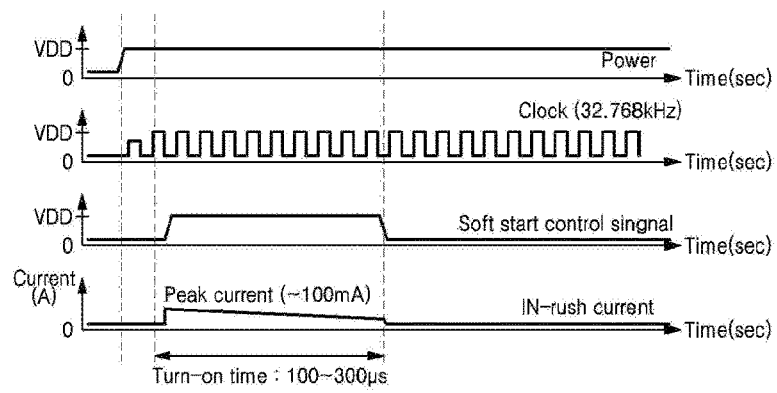
FIG. 4C illustrates an operation waveform of a switching regulator with a soft start circuit according to embodiments of the present disclosure.

In contrast, referring to FIG. 4C, in the switching regulator with the soft start circuit according to embodiments of the present disclosure, it can be seen that a peak current having a value of 100 mA or less occurs in a very short time range of 100 to 300 us (i.e., a soft start time).

As can be seen through FIG. 4C, the switching regulator with the soft start circuit according to embodiments of the present disclosure may shorten the time required to boot up a power supply device by implementing a soft start circuit by means of digital logic using a D-flip flop, and may use an internal system clock without implementing an additional circuit for generating a clock signal for counting the soft start time, thereby minimizing an increase in size. As a result, the switching regulator according to embodiments of the present disclosure is advantageous for high integration.

Figure 5:
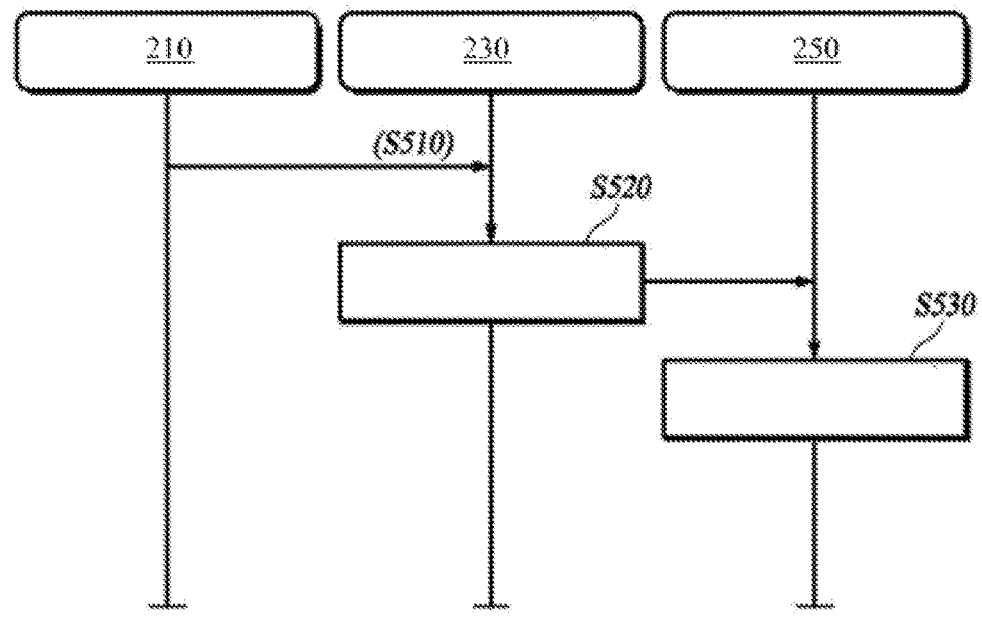
FIG. 5 is a flowchart illustrating a method of operating a switching regulator according to embodiments of the present disclosure.

FIG. 5 is a flowchart illustrating a method of operating a switching regulator with a soft start circuit according to embodiments of the present disclosure.

Referring to FIG. 5, at step S510, when power is applied to the switching regulator 100 and a certain period of time has elapsed, the clock signal supply unit 210 may supply a clock signal CLK having a constant magnitude to the soft start signal generation unit 230 through a clock buffer.

Here, the clock signal CLK may be a system clock output from an oscillator (not illustrated). Alternately, the clock signal CLK may be a real-time clock output from a crystal clock (X-tal; not illustrated). As described above, according to embodiments of the present disclosure, it is possible to simply implement a switching regulator having a soft start function by using the conventional system clock as it is, without additionally implementing a generation circuit of the clock signal for counting the soft start time.

At step S520, the soft start signal generation unit 230 may receive the clock signal from the clock signal supply unit 210 and generate a soft start signal that remains in an on-state during the soft start time. At this time, the generated soft start signal may be transmitted to the ramp voltage generation unit 250 and used to suppress the occurrence of the in-rush current. Here, the soft start time, which is the time required to prevent the occurrence of the in-rush current of the switching regulator 100, may be preset as, for example, the number of cycles of the clock signal and the like. In this case, the soft start signal may be a signal that remains in an on-state during the soft start time.

At step S530, the ramp voltage generation unit 250 may generate a ramp voltage Vramp by adjusting a resistance of a variable resistor during the soft start time under the control of the soft start signal input from the soft start signal generation unit 230. At this time, the ramp voltage generated by the ramp voltage generation unit 250 during the soft start time may be input to the error amplifier and used to control the power switch in a direction to suppress the in-rush current.

Although FIG. 5 illustrates that a plurality of processes are performed sequentially, this is merely illustrative of the technical idea of the present disclosure. In other words, it will be understood by those skilled in the art that various changes and modifications may be made without departing from the spirit and scope of the present disclosure by changing the order illustrated in FIG. 5 or performing a part of the plurality of processes in parallel, and thus FIG. 5 is not limited to a time sequential order.

The processes illustrated in FIG. 5 may be implemented as computer-readable codes on a computer-readable recording medium. The computer-readable recording medium may include all kinds of recording devices in which data that is readable by a computer system is stored.

That is, the computer-readable recording medium may include storage mediums such as a magnetic storage medium (e.g., a ROM, a floppy disk, a hard disk, and the like), an optical readable medium (e.g., a CD ROM, a DVD, and the like), and a carrier wave (e.g., transmission over the Internet). In addition, the computer-readable recording medium may be distributed over a computer system connected to a network so that the computer-readable codes are stored and executed in a distributed manner.

The above-description is merely illustrative of the technical idea of the present disclosure, and various modifications and changes may be made by those skilled in the art without departing from the spirit and scope of the present disclosure. The embodiments described herein are to be considered in a descriptive sense only, and not for purposes of limitation. Therefore, the scope of the present disclosure is defined not by the embodiments, but by the claims and their equivalents, and all variations within the scope of the claims and their equivalents are to be construed as being included in the present disclosure.

What is claimed is:

1. A switching regulator with a soft start circuit for suppressing an in-rush current, comprising:
   a peak detector configured to receive a clock signal and detect a peak voltage of the clock signal;
   a comparator configured to generate a soft start signal for controlling a soft start of the switching regulator based on a result of comparing a level of the peak voltage of the clock signal to a preset reference voltage level;
   a counter configured to switch a state of the soft start signal at a time point when a preset soft start time arrives; and
   a ramp voltage generation unit configured to generate a ramp voltage by adjusting a resistance of a variable resistor based on the soft start signal.

2. The switching regulator of claim 1, wherein the clock signal is a system clock output from an oscillator or a real-time clock output from a crystal clock.

3. The switching regulator of claim 1, wherein the comparator has hysteresis.

4. The switching regulator of claim 1, wherein the counter comprises N number of cascaded D-flip flops, and wherein a soft start time depends on the value of N.

5. The switching regulator of claim 4, wherein the counter determines that the soft start time has arrived at the time point when an output of each of the N number of D-flip flops is in a high state.

6. The switching regulator of claim 1, wherein a soft start time is set as a number of cycles of the clock signal.

7. A method of operating a switching regulator with a soft start circuit for suppressing an in-rush current, comprising:
   receiving a clock signal and detecting a peak voltage of the clock signal;
   generating a soft start signal for controlling a soft start of the switching regulator based on a result of comparing a level of the peak voltage of the clock signal to a preset reference voltage level; and
   generating a ramp voltage by adjusting a resistance of a variable resistor based on the soft start signal.

8. The method of claim 7, wherein the clock signal is a system clock output from an oscillator or a real-time clock output from a crystal clock.

9. The method of claim 7, wherein the soft start signal remains in an on-state until an output of each of N number of cascaded D-flip flops is in a high state.

10. The method of claim 7, wherein the soft start signal remains in an on-state during a preset cycle of the clock signal.

* * * * *